Nov. 18, 1969    J. C. ST. CLAIR    3,478,772

HIGH TEMPERATURE GAS VALVE

Filed Sept. 15, 1967

INVENTOR
John C. St. Clair 3,478,772
HIGH TEMPERATURE GAS VALVE
John C. St. Clair, Madison County, Ohio
(Box 333, R.R. 2, London, Ohio 43140)
Filed Sept. 15, 1967, Ser. No. 668,089
Int. Cl. F16k 25/00
U.S. Cl. 137—340                    5 Claims

ABSTRACT OF THE DISCLOSURE

An angle valve for stopping the flow of hot gases in which a narrow cooled metal surface is seated against a narrow water covered rubber seat. The rubber seat is in the bottom of a letter U like shaped structure, the walls of the letter U restraining the water over the rubber seat and reducing heat pick up by the water. There are walls on each side of the narrow cooled metal structure that is seated against the rubber seat to reduce heat pick up by the narrow cooled metal surface that rests, when the valve is closed, on the rubber seat. It is like a vertical letter M meshing into a vertical letter U.

---

Figures 1, 2:
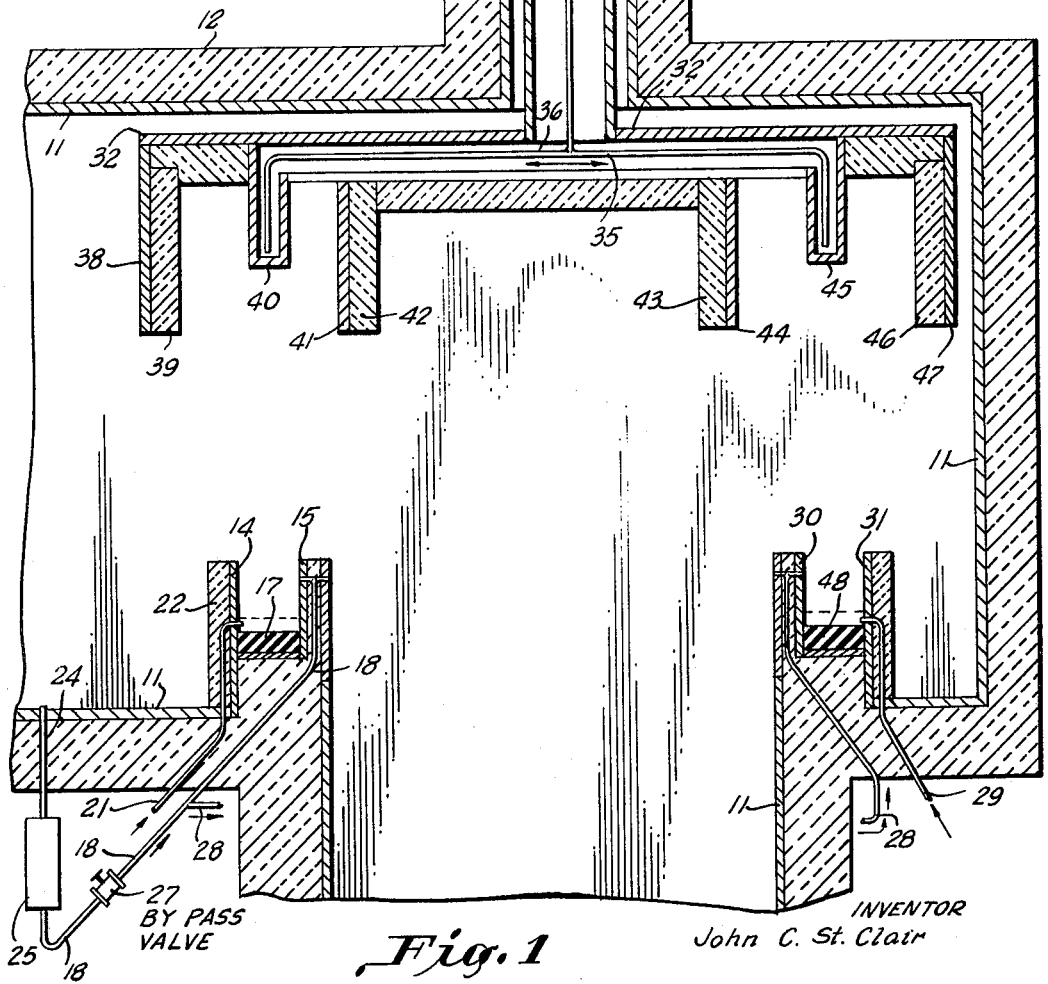

In its broadest form I am disclosing a valve for stopping the flow of hot gases which comprises a valve seat whose edge is made in the form of a letter U, the sides of the letter U being relatively perpendicular to the valve seat. The bottom of said letter U contains an elastomer and there are means to cool the elastomer by a cooling fluid. There is a cup like body to rest against the valve seat when it is desired to close the valve and stop the flow of the gas with said cup like body having an edge that is cooled by a cooling fluid. There are means for moving the cup like body towards the valve seat so that the cooled edge of the cup like body rests on the elastomer in the bottom of the U shaped edge of the valve seat and stops the flow of gas through the valve.

A cup like body is defined as any body that has a depression in it and when the body is held in a proper position the depression will hold liquid without substantial leakage.

It has been long known that the cheapest way to heat large volumes of gases is by the use of regenerative heat exchangers. However in many cases it is necessary to have valves to switch the flow of the gases at the hot ends of the regenerative heat exchangers and in many cases the temperatures involved are too high for prior valves. Examples of such cases are in the heating of gases for the gasification of coal by steam and in the recovery of waste heat in gas turbine engines. These examples are of great economic importance and if suitable high temperature gas valves were available very large savings would result.

FIG. 1 of the drawing is a vertical cross sectional view of one form of my invention.

FIG. 2 of the drawing is the part of FIG. 1 around the valve seat of the valve, and in particular plates 14 and 15, which has been enlarged.

Referring to the drawing there is shown at 11 the metal body of the valve. The outside of the valve body 11 is covered by insulation 12. The valve has a valve seat which on the left side of the valve is shown in detail in FIG. 2. In FIG. 2 the valve seat is shown as having a narrow strip of rubber 17. I prefer to use the term "elastomer" instead of rubber since the term "elastomer" is commonly used to mean all natural or synthetic materials which resemble natural rubber in mechanical properties though some synthetic elastomers can be used at much higher temperatures than natural rubber. The exact type of elastomer that is preferable depends on the degree of cooling for the elastomer valve seat that one designs into the valve. While elastomers that will stand temperatures in excess of 500° F. are available they are much more expensive and not as strong as elastomers that will only stand 200° F.

The rubber strip 17 is at the bottom of a U shaped trough formed by plates 14 and 15 on the sides and plate 16 on the bottom. A layer of a cooling fluid entering by pipe line 21 is maintained over the strip of rubber 17. Because of its cheapness and high cooling qualities I usually prefer to use distilled water as the cooling fluid.

The outer walls of the U shaped trough are insulated by insulation 22 and 23 as shown in FIG. 2.

It should be noted that the whole valve seat is identical to that shown in FIG. 2 though the part of the valve seat on the right side of the drawing is given different reference numerals. On the right hand side of the drawing the valve seat is a strip of rubber 48 between plates 30 and 31 and the cooling fluid enters by pipe line 29.

When it is desired to close the valve and stop the flow of gas through the valve a cup like body is lowered down onto the valve seat. The cup like body is raised and lowered by valve stem 33 which moves through stuffing box 32. The part of the valve body 11 near the stuffing box 32 is not insulated and hence is cooled by the surrounding air.

Onto valve stem 33 is fastened plate 32. On the left end of plate 32 is fastened a structure that resembles a letter M. One terminal leg of the letter M is formed by plate 38 and its insulation 39. The other terminal leg of the letter M is formed by plate 41 and its insulation 42. The center leg of the letter M is formed by hallow structure 40. Structure 40 is made hollow so that cooling gas entering by pipe line 34 and pipe line 36 can be discharged by pipe line 36 at the end of structure 40 and cool it. The cooling gas passes out through the hollow places beside the pipe lines that brought the cooling gas in.

On the right end of plate 32 is connected a letter M shaped structure that is identical with the letter M shaped structure just described as being on the left end of plate 32. The construction and use of pieces of apparatus with the reference numerals 47, 46, 45, 44, 43, and 35 are identical with those of the pieces of apparatus described in the preceding paragraph with the reference numerals 38, 39, 40, 41, 42 and 36 respectively.

The valve is shown in FIG. 1 with the valve wide open. When it is desired to close the valve the cup like body supported by valve stem 33 is lowered so that structure 40 rests on rubber strip 17 and structure 45 rests on rubber strip 48. This gives positive closure to the valve.

In the big use of this valve as a hot gas valve necessary with many types of regenerative heat exchangers it is possible to stop the flow of the gas by other means while the valve is being shut or opened. In this case there will be no problem of a rush of hot gas blowing the cooling fluid off the strips of rubber 17 and 48 just before the valve is closed or just as the valve is opened. However temporarily stopping the flow of the hot gas by other means is sometimes not cheap. Therefore I provide a method for allowing my valve to be closed or opened, while there is a flow of gas through the valve, without blowing the cooling fluid off the rubber strips 17 and 48. This is done by supplying a by-pass across the valve which takes hot gas from the body of the valve by pipe line 24, cools the hot gas by gas cooler 25 so that it can be controlled by elastomer seated by-pass valve 27, and then passes it by pipe line 18 and pipe lines 19 and 20 to the other side of the closed valve seat formed by structure 40 resting against rubber strip 17. It should be noted that the design shown in the drawing practically eliminates gas flow across the valve seat as the valve is finally being closed or is initially being opened.

The by-passing of gas to prevent blowing over of the cooling fluid on top of rubber strip 48 while the valve is being opened or closed is identical with that described for rubber strip 17 in the preceding paragraph. Part of the gas that passes through by-pass valve 27 flows by pipe line 18 and pipe line 28 to protect rubber strip 48 that is in the valve seat on the right side of the drawing.

One variation possible in large diameter hot gas valves used for gas turbines is not to use a liquid such as water to cover and cool the elastomer strips 17 and 48. In this case the elastomer strips 17 and 48 could be kept cool by a cold gas flowing in pipe lines 21 and 29. Similarly while the legs of the two M shaped structures are desirable these terminal legs (38, 41, 44 and 47) can be omitted. However in all cases the elastomer strips 17 and 48 and the structures 40 and 45 will be cooled. Elastomer strips 17 and 48 will always be protected by a U like structure.

It is believed that the reason that no one has ever attempted to design high temperature gas valves with cooled elastomer valve seats before is that no one has ever realized how low the heat transfer to the elastomer valve seats and metal edges that press against the valve seats is or can be made.

It should be emphasized that in high temperature heat transfer that the heat transfer by convection, or by friction of a hot gas against a cooler body, is seldom a large portion of the total heat transfer and in any case in the design of valves it can be made negligible by the use of baffles. These baffles keep gases from flowing at high velocities over the surfaces that must be kept cool.

The big thing to watch in high temperature work is the heat transfer by radiation. But at 1000° Fahrenheit, which is a commonly desired temperature for hot gas valves to be used with gas turbine engines, the rate of radiant heat transfer when we allow for the commonly encountered emissivity of surfaces is only about 7000 British thermal units per square foot per hour. This is the maximum amount of heat that can be transferred to a cold surface.

In a coal gasification unit the temperature that the valves must stand never is above 1800° F. At this temperature the heat radiated to a valve is 54,000 British thermal units per square foot per hour. However such units operate at high pressures that give very large capacities of mass flow through a given size valve. While the heat loss necessary to keep the valve parts cool is considerable it is still less than 1% of the total heat supplied to a typical coal gasification unit.

It should be noticed that the above assumed rates of heat transfer do not allow for the reduction of the rate of radiant heat transfer by the use of baffles more or less keeping the radiant heat off the surfaces desired to be cooled. Baffles will definitely reduce radiant heat losses though I have found that they are not as effective as one may first think. Complicated baffling will only pay for itself by lower heat losses if the valve is used a high percentage of the time and the cost of heat is high. Simple designs such as shown in the drawing already reduce the heat losses to a very low figure.

It should be noted that limited amounts of bare metal surfaces, when properly cooled, have been exposed to very much higher temperatures in furnaces by others many times. Temperatures at which radiation is ten times as great as the above maximum example of coal gasification valves given can be easily stood by properly cooled metal surfaces.

It should be noted that for example in a gas turbine engine that my high temperature valves permit the use of regenerative heat exchangers that usually save about 50% of the fuel required by the gas turbine power plant. Yet the heat loss due to my valves will be of the order of only several percent. Other advantages are obtained such as being able to efficiently operate the gas turbine at part loads.

In the case of a coal gasification process making methane my high temperature valves permit the use of regenerative heat exchangers that save large quantities of expensive oxygen at only a negligible heat loss from my valves. Besides the saving of oxygen required I also appreciably reduce the size of the coal gasification equipment and the equipment required to separate the desired methane product from the gases produced.

In all cases I have found that with valves of over 6 inches in inside diameter the heat loss from my cooled high temperature valves is insignificant compared to the profits obtained from being able to use regenerative heat exchangers.

Many obvious details have been omitted. For example it is desirable to insulate plate 32 from above. Means for assembling the valve are not shown.

In the example it is assumed that the valve would be operating for a gas turbine with valve temperatures of the order of 900° F. to 1000° F. If higher temperatures are to be designed against, extensive insulation of the structure that carries structures 40 and 45 and is lowered to close the valve is desirable to prevent heat losses and undue expansion of metal parts. Also instead of directly lowering from above the large struuture against the valve seat the structure may obviously be mounted on a hinge like arm. Also wire or wire mesh may be used instead of plates 38, 41, 44 and 47 to prevent thermal expansion troubles.

I claim:

1. A valve for stopping the flow of hot gases which comprises: a valve seat whose edge is made in the form of a letter U, the sides of the letter U being relatively perpendicular to the valve seat, the bottom of said letter U containing an elastomer and there being means to cool the elastomer by a cooling fluid, and a cup like body to rest against the valve seat when it is desired to close the valve and stop the flow of the gas, said cup like body having an edge that resembles a letter M, the center leg of the letter M being kept cool by not only a cooling fluid but also by the protection of the terminal legs of the letter M, and means for moving the cup like body towards the valve seat so that the M like edge of the cup like body will mesh over the U like edge of the valve seat and the cooled center leg of the letter M rests on the elastomer in the bottom of the letter U.

2. A valve for stopping the flow of hot gases which comprises: a horizontal valve seat whose edge is made in the form of a vertical letter U, the bottom of said letter U containing an elastomer and there being means to keep the elastomer covered with a layer of a cooling liquid, and a cup like body to rest against the valve seat when it is desired to close the valve and stop the flow of the gas, said cup like body having an edge that resembles a letter M, the center leg of the letter M being kept cool by not only a cooling fluid but also by the protection of the terminal legs of the letter M, and means for moving the cup like body towards the valve seat so that the M like edge of the cup like body will mesh over the U like edge of the valve seat and the center leg of the letter M rests on the elastomer in the bottom of the letter U.

3. An apparatus according to claim 2 in which the cooling liquid covering the elastomer is water.

4. A valve for stopping the flow of hot gases which comprises: a valve seat whose edge is made in the form of a letter U, the sides of the letter U being relatively perpendicular to the valve seat, the bottom of said letter U containing an elastomer and there being means to cool the elastomer by a cooling fluid, and a cup like body to rest against the valve seat when it is desired to close the valve and stop the flow of the gas, said cup like body having an edge that is cooled by a cooling fluid, and means for moving the cup like body towards the valve seat so that the cooled edge of the cup like body rests on the elastomer in the bottom of the U shaped edge of the valve seat and stops the flow of gas through the valve.

5. An apparatus according to apparatus claim 4 where the valve is used in a gas turbine engine for a self propelled vehicle.

References Cited

UNITED STATES PATENTS

| | | | |
|---|---|---|---|
| 246,132 | 8/1881 | Hastings | 251—333 XR |
| 1,087,021 | 2/1914 | Kerbaugh | 251—333 XR |
| 1,165,007 | 12/1915 | Knox | 137—340 XR |
| 1,342,955 | 6/1920 | Gebhardt | 251—333 |
| 1,818,856 | 8/1931 | Langdon | 251—333 XR |
| 2,013,860 | 9/1935 | McElwaine | 251—333 XR |
| 2,221,233 | 11/1940 | Emery | 251—333 XR |
| 3,110,319 | 11/1963 | Arata et al. | 137—341 XR |
| 3,253,300 | 5/1966 | Gove et al. | 251—333 XR |

SAMUEL SCOTT, Primary Examiner